US009435185B2

(12) United States Patent
Wright et al.

(10) Patent No.: US 9,435,185 B2
(45) Date of Patent: Sep. 6, 2016

(54) SUBSEA TECHNIQUE FOR PROMOTING FLUID FLOW

(75) Inventors: David C. Wright, Humble, TX (US); Jeffery Wilbert Dufrene, Thibodaux, LA (US)

(73) Assignee: Wright's Well Control Services, LLC, Spring, TX (US)

( * ) Notice: Subject to any disclaimer, the term of this patent is extended or adjusted under 35 U.S.C. 154(b) by 1497 days.

(21) Appl. No.: 12/978,448

(22) Filed: Dec. 24, 2010

(65) Prior Publication Data

US 2011/0158824 A1 Jun. 30, 2011

Related U.S. Application Data

(60) Provisional application No. 61/290,168, filed on Dec. 24, 2009.

(51) Int. Cl.
| | |
|---|---|
| *E21B 43/36* | (2006.01) |
| *F04B 47/08* | (2006.01) |
| *B01D 19/00* | (2006.01) |
| *E21B 43/01* | (2006.01) |
| *E21B 37/06* | (2006.01) |
| *E21B 43/12* | (2006.01) |

(52) U.S. Cl.
CPC ........... *E21B 43/36* (2013.01); *B01D 19/0042* (2013.01); *E21B 37/06* (2013.01); *E21B 43/129* (2013.01); *E21B 2043/0115* (2013.01); *F04B 47/08* (2013.01)

(58) Field of Classification Search
CPC .................. E21B 43/03; E21B 43/36; E21B 2043/0115; E21B 43/129; E21B 37/06; B01D 19/0042; F04C 13/008; F04B 47/08

USPC ....... 417/375, 408; 166/105.5, 304; 175/5, 6
See application file for complete search history.

(56) References Cited

U.S. PATENT DOCUMENTS

| | | | |
|---|---|---|---|
| 4,173,533 A | 11/1979 | Williams | |
| 4,208,152 A * | 6/1980 | Colston | 405/186 |
| 4,386,654 A * | 6/1983 | Becker | 166/105.5 |
| 4,813,495 A * | 3/1989 | Leach | 175/6 |
| 5,044,440 A | 9/1991 | Stinessen | |
| 5,474,601 A | 12/1995 | Choi | |

(Continued)

FOREIGN PATENT DOCUMENTS

| | | | | |
|---|---|---|---|---|
| GB | 2255102 A | * | 10/1992 | |
| WO | WO 2007092956 A2 | * | 8/2007 | ............. E21B 17/01 |
| WO | WO 2008-144338 | | 11/2008 | |

OTHER PUBLICATIONS

Bolliavaram (Hydrate Plug Dissociation in Pipelines, 2002).*

(Continued)

*Primary Examiner* — Charles Freay
*Assistant Examiner* — Nathan Zollinger

(57) ABSTRACT

The present application is directed to a submersible pumping system operable under hydrostatic pressure. The system suitably comprises a prime mover submersible within a first fluid; a pump means submersible within the first fluid and sealably coupled to the prime mover; and a fluid source in fluid communication with the prime mover, the fluid source providing a second fluid effective to act on the prime mover to power the pump means; wherein the second fluid is discharged in the first fluid after acting on the prime mover; and wherein the second fluid has a chemical composition substantially similar to the first fluid.

13 Claims, 9 Drawing Sheets

(56) References Cited

U.S. PATENT DOCUMENTS

| | | |
|---|---|---|
| 5,482,117 A | 1/1996 | Kolpak |
| 5,490,562 A | 2/1996 | Arnold |
| 6,059,539 A | 5/2000 | Nyilas |
| 6,082,452 A | 7/2000 | Shaw |
| 6,138,758 A | 10/2000 | Shaw |
| 6,200,068 B1 | 3/2001 | Bath |
| 6,216,799 B1 * | 4/2001 | Gonzalez .................. 175/5 |
| 6,238,569 B1 | 5/2001 | Favret |
| 6,454,492 B1 | 9/2002 | Dean |
| 6,651,745 B1 | 11/2003 | Lush |
| 6,772,840 B2 | 8/2004 | Headworth |
| 6,939,082 B1 | 9/2005 | Baugh |
| 7,011,152 B2 | 3/2006 | Soelvik |
| 7,013,978 B2 | 3/2006 | Appleford |
| 7,066,248 B2 | 6/2006 | Howell |
| 7,279,052 B2 | 10/2007 | Kinnari |
| 7,281,880 B2 | 10/2007 | Tucker |
| 7,546,880 B2 * | 6/2009 | Zhang ............ E21B 43/0122 166/302 |
| 7,569,097 B2 | 8/2009 | Campen |
| 8,881,843 B2 * | 11/2014 | Todd .................. E21B 17/01 166/267 |
| 9,303,488 B2 * | 4/2016 | Kanstad ................ F28G 9/00 |
| 2001/0011556 A1 | 8/2001 | Butler |
| 2003/0106714 A1 | 6/2003 | Smith |
| 2003/0145991 A1 | 8/2003 | Olsen |
| 2003/0159581 A1 | 8/2003 | Sanderford |
| 2003/0188873 A1 | 10/2003 | Anderson |
| 2004/0099422 A1 | 5/2004 | Lush |
| 2004/0200621 A1 | 10/2004 | Ostergaard |
| 2004/0244983 A1 | 12/2004 | Appleford |
| 2004/0251019 A1 | 12/2004 | Howell |
| 2005/0061515 A1 | 3/2005 | Hopper |
| 2005/0072301 A1 | 4/2005 | Baciu |
| 2005/0145388 A1 | 7/2005 | Hopper |
| 2005/0150827 A1 | 7/2005 | Hopper |
| 2006/0175063 A1 | 8/2006 | Balkanyi |
| 2007/0003371 A1 | 1/2007 | Yemington |
| 2007/0029091 A1 * | 2/2007 | Stinessen et al. ............ 166/357 |
| 2007/0107907 A1 | 5/2007 | Smedstad |
| 2007/0119622 A1 * | 5/2007 | Ayling ........................... 175/5 |
| 2007/0131429 A1 | 6/2007 | Brammer |
| 2008/0017247 A1 | 1/2008 | D'antona |
| 2008/0264645 A1 | 10/2008 | Shen |
| 2008/0282776 A1 | 11/2008 | Loeb |
| 2008/0282777 A1 | 11/2008 | Loeb |
| 2009/0124520 A1 | 5/2009 | Tohidi |
| 2009/0211764 A1 | 8/2009 | Fielding |
| 2009/0232664 A1 | 9/2009 | Qu |
| 2010/0047022 A1 * | 2/2010 | Le Moign ............... E02F 3/907 405/184.1 |
| 2011/0232912 A1 * | 9/2011 | Close .......................... 166/335 |

OTHER PUBLICATIONS

PCT Notification of Transmittal of the International Search Report and the Written Opinion of the International Searching Authority, or the Declaration; Jun. 29, 2011; International Application No. PCT/US2010/062107; International Searching Authority, Korean Intellectual Property Office.

PCT Notification of Transmittal of the International Search Report and the Written Opinion of the International Searching Authority, or the Declaration. Sep. 30, 2011; International Application No. PCT/US2010/062109; International Searching Authority, Korean Intellectual Property Office.

* cited by examiner

| ROTOR | | | STATOR | | | RATE | | PRESSURE | |
|---|---|---|---|---|---|---|---|---|---|
| M (mm) | G (mm) | D (mm) | F (mm) | E THREAD API 11 B | A (mm) | B (mm) | C (mm) | B/D (rpm) | M³/D (rpm) | PSI | BAR |
| ABOUT 9425 | ABOUT 9200 | ABOUT 71.5 | ABOUT 84.1 | ABOUT 3.96 cm (1.9/16 in.) FOR ROD 2.86 cm (1.1/8 in.) | ABOUT 8550 | ABOUT 9265 | ABOUT 600 | ABOUT 4.65 | ABOUT 0.740 | ABOUT 3500 | ABOUT 240 |

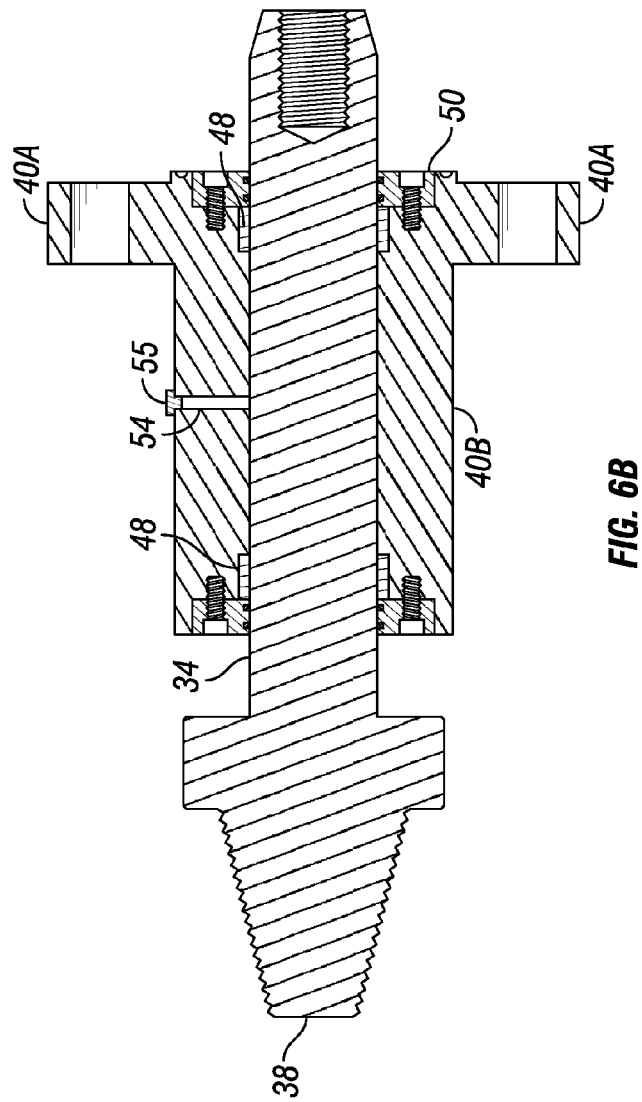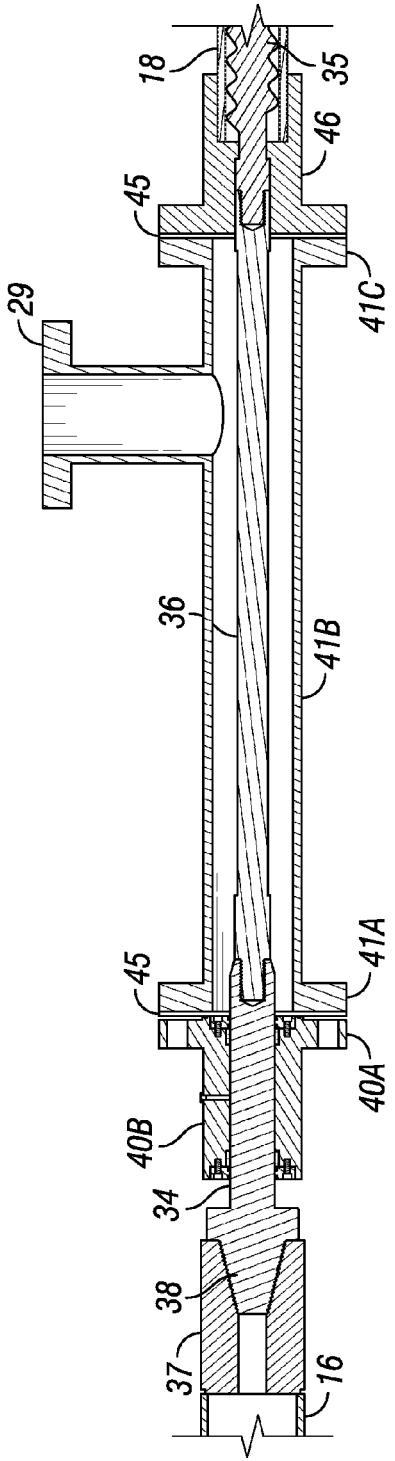
FIG. 6B
FIG. 6C

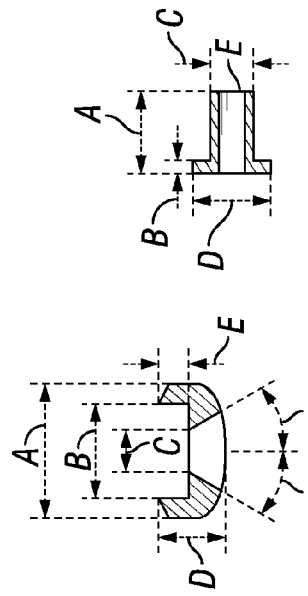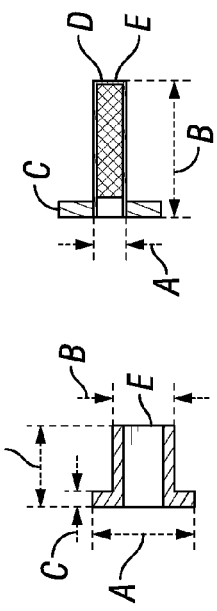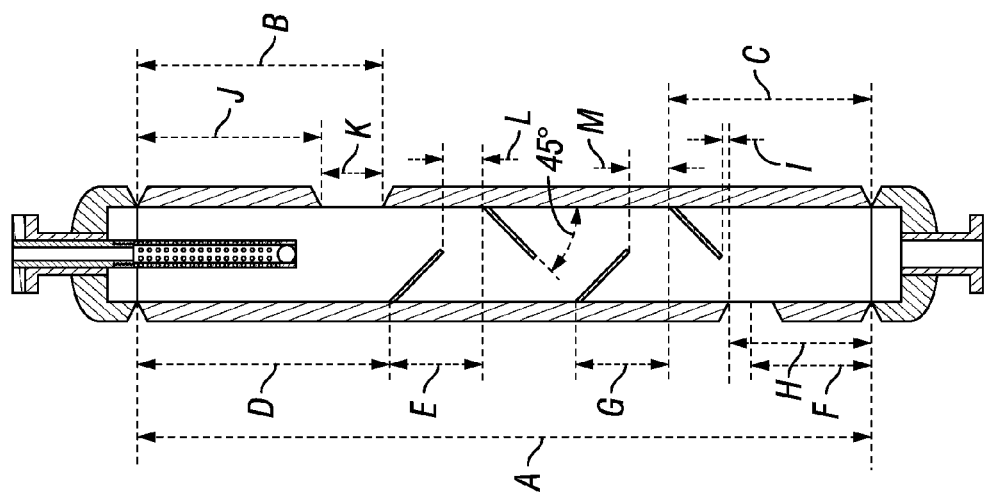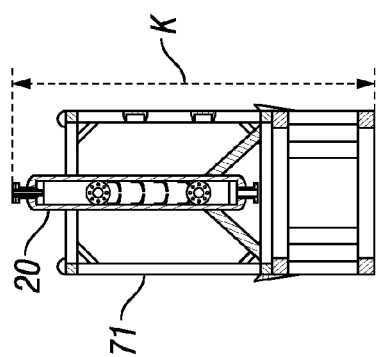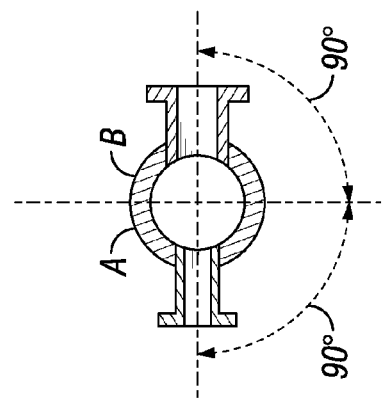
FIG. 11D
FIG. 11F
FIG. 11C
FIG. 11E
FIG. 11A
FIG. 10C
FIG. 11B

SUBSEA TECHNIQUE FOR PROMOTING FLUID FLOW

CROSS-REFERENCE TO RELATED APPLICATIONS

The application is entitled to the benefit of the filing date of the prior-filed provisional application No. 61/290,168, filed on Dec. 24, 2009.

STATEMENT REGARDING FEDERALLY SPONSORED RESEARCH OR DEVELOPMENT

Not applicable.

FIELD OF THE APPLICATION

The application relates generally to promoting flow or transfer of fluids through subsea conduits.

BACKGROUND

In a variety of subsea applications, fluids are directed from one locale to another. Depending on the activity, fluid may be directed through subsea flowlines located on the seafloor or directed upwardly from a subsea well, pipe, vessel, or other container to the water surface. Typically, subsea pumps are used to direct subsea fluids from one locale to another. In one known subsea pumping technique, hydraulic drive systems have been employed for powering subsea pumps. However, the motor powering the pump may have to overcome a given hydrostatic pressure when returning motor fluids back to the water surface, the result may include a time intensive endeavor placing an unwanted load on the motor powering the subsea pump. In another known subsea pumping technique, electric drive systems have been employed to power subsea pumps. However, at great depths it may be difficult to supply the necessary current and amperage to effectively pump fluids to the water surface from great depths.

A more efficient technique for transporting subsea fluid is desired.

In petroleum production, oil and its byproducts are typically removed from wells and transported through pipelines, including subsea pipelines. The flow of oil and other fluids through a subsea pipeline can lead to the build up of different substances within the pipe impeding fluid flow there through. For example, scale, paraffin wax, gas hydrates, debris or sand may buildup in the pipeline over time depending on the nature of the fluid flowing through the pipeline and other surrounding circumstances.

One method to prevent the formation of paraffin deposits is to heat the pipelines. However, this method is very expensive and is not feasible for subsea pipelines submerged in the cold sea water. Another method involves "pigging", wherein a mechanical device is passed through the pipeline scraping the inner wall of the pipeline and pushing paraffin deposits through. Another method for removing paraffin deposits is "hot oiling," wherein a heated oil is pumped through the pipeline in order to remove the paraffin wax deposits.

Another cause of blockage in subsea pipelines is the formation of gas hydrates where an aqueous phase is inherently present, during the transportation of fluids including gases. This is a common problem, especially in deep sea conditions including low temperatures. Low temperatures and the presence of water lead to formation of gas hydrates in the pipelines.

One method of dealing with gas hydrates is to insulate the pipeline. But, this approach is typically expensive. Another method is to pump methanol through the pipeline or use chemical methods such as addition of anti-agglomerates (e.g. kinetic inhibitors or thermodynamic inhibitors). However, to be effective, large quantities of these chemicals are required making the process expensive.

SUMMARY

The present application is directed to a submersible pumping system operable under hydrostatic pressure. The system suitably comprises a prime mover submersible within a first fluid; a pump means submersible within the first fluid and sealably coupled to the prime mover; and a fluid source in fluid communication with the prime mover, the fluid source providing a second fluid effective to act on the prime mover to power the pump means; wherein the second fluid is discharged in the first fluid after acting on the prime mover; and wherein the second fluid has a chemical composition substantially similar to the first fluid.

The present application is also directed to a system for transporting a target fluid from a subsea environment to the water surface. The system suitably comprises a surface platform and a fluid transport means including (1) a drill motor positioned subsea, and (2) a pump means coupled to the drill motor, the fluid transport means being operationally configured to receive sea water from the surface platform and convey the target fluid from a subsea locale to the surface platform, the sea water being effective to power the fluid transport means.

The present application is also directed to a method of powering a pump in a subsea environment. The method suitably comprises (a) providing a system including (1) a surface platform, (2) a drill motor in fluid communication with the surface platform; (b) installing the drill motor subsea; (c) coupling the drill motor to the pump in a manner effective for the drill motor to activate the pump during system operation; and (d) conveying seawater to the drill motor from the surface platform, the seawater being effective to power the drill motor to activate the pump.

BRIEF DESCRIPTION OF THE FIGURES

FIG. 6B illustrates a drive shaft of the prime mover of the system in a mated position with the first sealing member of FIG. 6A.

FIG. 6C illustrates another simplified embodiment of a subsea coupling assembly of the present system.

FIG. 10C illustrates a side elevational view of the separator means and accompanying frame.

FIG. 11A illustrates a sectional view of a simplified embodiment of a separator means of the present system.

FIG. 11B illustrates a top sectional view of the separator means of FIG. 11A.

FIG. 11C illustrates a side sectional view of an end cap of the separator means of FIG. 11A.

FIG. 11D illustrates a side view of the non-gaseous fluid outlet of the separator means of FIG. 11A.

FIG. 11E illustrates a side view of a fluid inlet of the separator means of FIG. 11A.

FIG. 11F illustrates a filter assembly of the fluid inlet of FIG. 11E.

BRIEF DESCRIPTION

Figure 1:
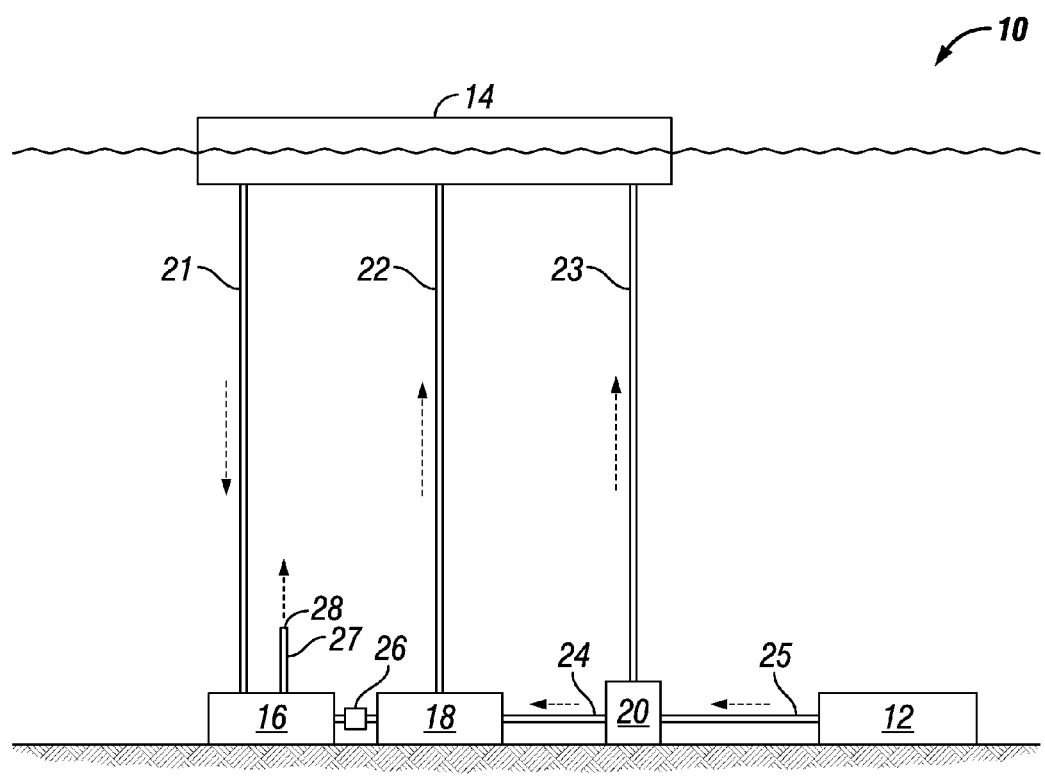
FIG. 1 illustrates a simplified embodiment of the present system.

It has been discovered that a drilling motor may be used as a prime mover in subsea operations for powering a plurality of turnable or rotatable devices. For example, it has been discovered that a drilling motor may be used in deep water or ultra deep water operations as a prime mover of a pump means to transfer fluids in activities such as hydrate recovery or remediation, pipeline abandonments, dewatering pipelines, subsea well kill operations, well draw downs, and for flushing subsea pipelines by increasing the flow rate of fluid to the surface of the water as compared to the flow rate generated by electric motors and hydraulic motors. In operation, the drilling motor is suitably powered by flowable fluid that is dischargeable within the ambient subsea environment, eliminating the need to (1) pump motor fluid back to the surface as required when employing hydraulic motors, and (2) provide electric power to great depths as required when employing electric motors. By employing a drill motor powered by dischargeable fluid as a subsea prime mover, a reduced load is placed on the drilling motor as compared to either a hydraulic motor or electric motor. Heretofore, such a desirable achievement has not been considered possible, and accordingly, the system and method of this application measure up to the dignity of patentability and therefore represents a patentable concept.

Before describing the invention in detail, it is to be understood that the present system and method are not limited to particular embodiments. It is also to be understood that the terminology used herein is for the purpose of describing particular embodiments only, and is not intended to be limiting. As used in this specification and the appended claims, the phrase "drill motor" refers to a drill motor or mud motor as commonly used in a drill string to provide additional power to a bit during drilling. The phrase "deep water" includes subsea depths from about 914 m to about 2286 m (about 3,000 feet to about 7,500 feet). The phrase "ultra deep water" includes subsea depths of about 2286 m or more (about 7,500 feet or more). The term "PLET" stands for pipeline end termination. The phrase "surface platform" refers to a floating vessel, a stationary platform above the surface of the water, or dry land. The term "pipeline" refers to a conduit made from pipes connected end-to-end for fluid transport, including but not necessarily limited to petroleum conduits located above ground, underground, and subsea. The phrase "sea water" refers to water originating from the lake, sea, or ocean in which the present system is operating. The acronym "BPM" refers to barrels per minute. The acronym "LPM" refers to liters per minute. The acronym "GPM" refers to gallons per minute. The term "surface" as such relates to the present subsea system refers to the water surface of the body of water containing the system. Rotatable and turnable devices include those devices acted on by a corresponding drill motor of this application. Without limiting the types of rotatable and turnable devices, suitable devices for subsea purposes may include the rotating armature of a motor, pump or generator.

In one aspect, the application introduces a petroleum type drilling motor, also referred to as a mud motor, as the prime mover in subsea environments for powering turnable and rotatable items.

In another aspect, the application introduces a petroleum type drilling motor as the prime mover for turnable and rotatable items in subsea environments at depths up to about 4572 meters (about 15000 feet).

In another aspect, the application provides a system providing for the conveyance of fluid from a subsea locale to a surface locale.

In another aspect, the application provides a system providing for the conveyance of fluid from a deep water or ultra deep water locale to a surface locale, the system incorporating coiled tubing having an outer diameter of about 6.03 cm (about 2.375 inches) or more.

In another aspect, the application introduces a subsea separator operationally configured to separator gas from non-gaseous fluid prior to the gas and non-gaseous fluid being conveyed toward the surface.

In another aspect, the application provides a subsea drilling motor as a prime mover for a subsea pump means, the pump means being operationally configured to convey fluid from a subsea environment to the surface.

In another aspect, the application provides a subsea separator qualified for depths of about 2195 meters (about 7200 feet) according to the American Petroleum Institute ("API").

In another aspect, the application provides a means of acting on a target fluid in a subsea environment to separate gas from the target fluid prior to conveying the fluid to the surface.

In another aspect, the application provides a means for pumping fluid from a subsea environment to the surface using a subsea pump means powered by a subsea drill motor, the drill motor in turn being powered by water conveyed from the surface to the drill motor.

In another aspect, the application provides a means for conveying fluid from a subsea environment to the surface using a subsea prime mover powered by water pumped from a surface locale to the subsea prime mover. Once water has acted on the prime mover, the water may be discharged into the ambient subsea environment.

In another aspect, the application provides a system for conveying fluid from a subsea locale to a surface locale, the system including a subsea prime mover activated by fluid having a substantially similar chemical composition as the ambient subsea environment of the system.

In another aspect, the application provides a system and method for pumping fluid from a subsea location to the surface using a drilling motor and a pump. The system includes a flex-shaft seal assembly coupled to the pump rotor to compensate for the eccentric rotation and vibration of the pump.

In another aspect, the application provides a system and method for subsea pipeline hydrate remediation.

In another aspect, the application provides a system and method for subsea pipeline plug remediation.

In another aspect, the application provides a system and method for pipeline "pigging," as the term is known to persons of ordinary skill in the petroleum industry.

In another aspect, the application provides a system and method for evacuating subsea pipelines in deep water and ultra deep water.

In another aspect, the application provides a system and method for chemical injection into subsea pipelines in deep water and ultra deep water.

In another aspect, the application provides a system and method using less energy to move more fluid from a subsea location to the surface of the water as compared to existing electric motors and hydraulic motors.

In another aspect, the application provides a system operational at subsea depths from about 45.7 meters to about 4572 meters (about 150 feet to about 15,000 feet).

In another aspect, the application provides a system and method for powering a drilling motor with filtered sea water dischargeable into the ambient environment below the surface.

In another aspect, the application provides a system and method for moving fluid from a subsea location to the surface of the water at a hydrostatic pressure up to about 463 bar (about 6708 psi).

In another aspect, the application provides a system operationally configured to tie into a pipeline at a subsea location.

In another aspect, the application provides a system and method for pumping fluid from a subsea pipeline at a depth of about 2134 meters (about 7,000 feet) to the surface of the water at a rate about 75 liters (about 20 gallons) or more per minute.

In another aspect, the application provides a system operational at subsea depths up to about 4572 meters (about 15,000 feet) and/or a hydrostatic pressure of about 463 bar (about 6708 psi), the system operationally configured to pump fluid from such depth to the water surface at a rate of about 227 liters (about 60 gallons) or more per minute.

In another aspect, the application provides a system and method effective for dropping pressure within a pipeline downstream of an ice plug.

In another aspect, the application provides a removable system operationally configured to be tested, repaired or otherwise serviced above the surface of the water. Optionally, the system may be tested, repaired or otherwise serviced at a predetermined depth below the surface of the water.

In another aspect, the application provides a system including at least a separator, a pump, and a motor.

In another aspect, the application provides a system and method that does not require a return line from the prime mover to a surface platform.

In another aspect, the application provides a system that may be built to scale.

In another aspect, the application provides a system tethered to a surface vessel. Alternatively, the system may be tethered to one or more land based components.

In another aspect, the application provides a system that meets all required American Petroleum Institute ("A.P.I.") tolerances. In another aspect, the system tolerances are greater than the corresponding A.P.I. tolerances.

In another aspect, the application provides a system operationally configured for deep water or ultra deep water operation including a sealable housing at the point of connection between the motor and pump, the housing having a flex joint allowing the rotor drive systems of the motor and pump to turn true center during operation.

In another aspect, the application provides a system operationally configured for deep water or ultra deep water pumping of fluid from the seafloor to the surface, the system being operationally configured to recover about seven times more fluid from a subsea locale than is necessary to power a subsea pump means.

In still another aspect, the application provides a system for recovering fluid from a subsea locale to a surface locale, the system requiring less than one-fifth the amount of fluid to power the subsea system component(s) than is recovered to the surface.

DISCUSSION OF THE SYSTEM AND METHOD

To better understand the novelty of the system and method of use thereof, reference is hereafter made to the accompanying drawings. With reference to FIG. 1, a simplified illustration of the present system 10 is provided. Suitably, the system 10 includes a drill motor as a prime mover in subsea environments. With reference to FIG. 1, the system 10 may be operationally configured to treat one or more target fluid sources 12 to provide fluid flow of the target fluid. For example, the present system 10 may be operationally configured for subsea hydrate recovery or remediation, plug remediation, dewatering purposes, flushing purposes, cleaning purposes, evacuation purposes, recovery purposes, and combinations thereof. In a particularly advantageous embodiment, the system 10 may be operationally configured for use in deep water or ultra deep water environments.

Still referring to FIG. 1, the system 10 suitably includes a surface platform 14, at least one drill motor 16, at least one pump means 18, and at least one separator means 20, although the system 10 may be provided without a separator means 20 as desired. Fluid flow within the system 10 is provided via fluid conveyance means 21, 22, 23, 24, and 25 (hereafter referred to as "conduit"), which may include conventional metal piping including coiled tubing, flexible hose, flexible piping, and combinations thereof, the arrows illustrating the directional flow of fluid within each of the conduits 21, 22, 23, 24, and 25. As shown, conduit 21 is operationally configured to provide a fluid connection between the surface platform 14 and the drill motor 16 for conveying fluid to the drill motor 16 to power the drill motor 16. In turn, the drill motor 16 is operationally configured to power one or more rotatable or turnable devices including, but not necessarily limited to pumps, generators, and hydraulic power units depending on the particular use of the system 10.

Suitably, the drill motor 16 is coupled to a pump means 18 in a manner effective to act on the pump means 18 to provide a pulling force whereby fluid contained within a target fluid source 12 may be drawn toward the pump means 18. In this embodiment, fluid flows through a separator means 20 prior to reaching the pump means 18 wherein gases may be separated out from the target fluid and directed toward the surface platform 14 via conduit 23. The non-gaseous fluid is suitably drawn to the pump means 18 via conduit 24 and there after directed toward the surface platform 14 via conduit 22.

In one embodiment, the drill motor 16 may be directly coupled to the pump means 18. In subsea environments where the integrity of the pump means 18 may be compromised when exposed to external ambient hydrostatic pressure, the drill motor 16 is suitably coupled to the pump means 18 via a coupling assembly 26, whereby operation of the pump means 18 is dictated according to fluid flow from the surface platform 14 to the drill motor 16 via conduit 21. As FIG. 1 illustrates, a fluid return line to the surface for the fluid powering the drill motor 16 is not required. Rather, spent fluid may be discarded into the ambient environment via a fluid outlet 28.

As opposed to other subsea motors that are powered either hydraulically or electrically, the present subsea drill motor 16 is suitably powered by one or more flowable fluids including, but not necessarily limited to water based liquids, oil based liquids, gaseous drilling fluids, non-aqueous muds, compressed air, and combinations thereof. As stated above, fluids are suitably conveyed to the drill motor 16 via one or more conduits 21. A suitable conduit 21 (also referred to as a "drop" by persons of ordinary skill in the art of subsea operations) may include, but is not necessarily limited to coiled tubing, non-collapsible hose, subsea umbilicals, and combinations thereof. For the purposes of this application, the drill motor 16 is suitably powered by one or more flowable fluids dischargable into the ambient water without the introduction of a foreign fluid type into the ambient subsea environment. Fluids are suitably directed to the drill motor 16 via one or more surface pumps or vacuum systems located at the surface platform 14. In operation, once fluid has been used to power the drill motor 16, the spent fluid may be discharged into the ambient subsea environment via a fluid outlet 28 represented in FIG. 1 as a vent stack 27. Suitable surface pumps are commercially available from Halliburton, USA, Houston, Tex.; Gardner Denver, Quincy, Ill.; and SERVAgroup, Wichita Falls, Tex.

In one embodiment, the drill motor 16 may be powered by water conveyed from the surface platform 14. In an embodiment of the system 10 operationally configured for salt water environments, the drill motor 16 may be powered using salt water or filtered salt water conveyed from the surface platform 14. In an embodiment of the system 10 operationally configured for fresh water environments, the drill motor 16 may be powered by filtered water directed from the surface platform 14. In another embodiment, a fluid composition substantially similar to the ambient subsea environment may be employed to power the drill motor 16. In a particularly advantageous embodiment of the system 10 operationally configured for ocean or sea environments, the drill motor 16 may be powered by sea water collected at the surface platform 14.

Figure 2:
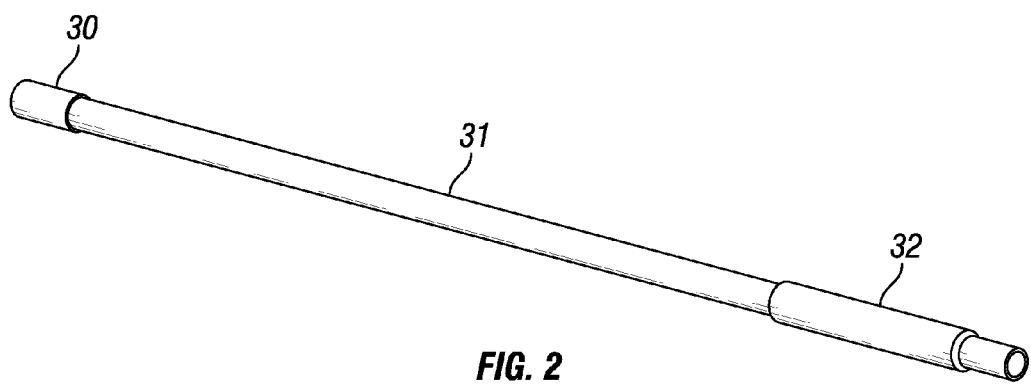
FIG. 2 illustrates a simplified embodiment of a subsea prime mover of the present system.

A suitable drill motor is illustrated in FIG. 2. Although not necessarily limited to a particular configuration, a suitable drill motor 16 includes a top sub portion 30, a power section 31, and a bearing assembly 32 as common to drill motors. In a particularly advantageous embodiment, the drill motor 16 includes a progressive cavity positive displacement type pump as used in drill string for providing power to a drill bit during drilling. Although the drill motor 16 may be built to scale and include various rotor and stator specifications, a suitable power section 31 includes the specifications as listed below in Tables 1-4.

TABLE 1

ROTOR SPECIFICATIONS

|  | mm | inch |
|---|---|---|
| Overall Length | about 4978 | about 196.0 |
| Contour Length | about 4801 | About 189.0 |
| Eccentricity | about 10.34 | About 0.407 |
| Major Diameter | CONF | CONF |
| Head Diameter | about 88.90 | about 3.50 |
| Weight | about 193.7 kg (427 lbs) | |
| Material | Stainless Steel, e.g., 17-4SS | |
| Thread Form | 2⅜ API REG or equivalent | |

TABLE 2

STATOR SPECIFICATIONS

|  | mm | inch |
|---|---|---|
| Overall Length | about 5169 | about 203.5 |
| Rubber Cut Back | about 191.0 | about 7.50 |
| Tube Outer Diameter | about 171.5 | about 6.75 |
| Tube Inner Diameter | about 139.7 | about 5.50 |
| Weight | about 351 kg (774 lbs) | |
| Number of Stages | 7.80 | |
| Rubber Type | NBR-1A, HSN-38 | |
| Tube Material | 4142 Seamless Tubing | |

TABLE 3

PERFORMANCE SPECIFICATIONS

| Torque Slope | about 0.553 Nm/kPa (about 2.813 ft-lb/psi) |
| Flow Range | about 1140 to about 2270 Liter/min (about 300 to 600 GPM) |
| Rotation | about 0.264 Rev/Liter (about 1.000 Rev/Gallon) |
| Speed Range | from about 300 to about 600 RPM |
| Off Bottom Press | about 1580 kPa (about 229 psi) |

TABLE 4

PERFORMANCE DETAILS

| Max Diff Press kPa (psi) | about 8070 (about 1170) |
| Max Torque Nm (ft-lb) | about 4460 (about 3290) |
| Stall Diff Press kPa (psi) | about 12100 (about 1760) |
| Stall Torque Nm (ft-lb) | about 6690 (about 4940) |
| Max Recommended kW (HP) | about 226 (about 302) |

A suitable power section of the drill motor 16 is commercially available from Dyna-Drill, Houston, Tex. A suitable complete drill motor 16 is commercially available from TomaHawk Downhole, LLC, Lafayette, Lousiana. Comparable power sections and complete drill motors may be acquired by other like manufacturers.

Figures 3, 4:
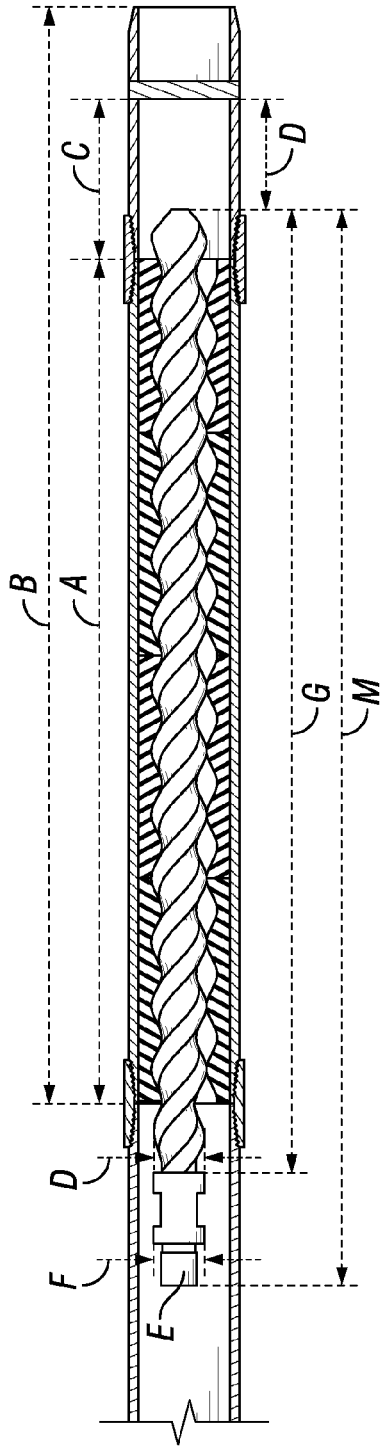
FIG. 3 illustrates a simplified embodiment of a subsea pump means of the present system.
FIG. 4 illustrates dimensional properties of the subsea pump means depicted in FIG. 3.

Although not necessarily limited to a particular means for producing fluid flow, a suitable pump means 18 for subsea applications includes a corkscrew pump. In a particularly advantageous embodiment, the pump means 18 includes a submersible progressing cavity pump or "PCP pump" as understood by persons of ordinary skill in the art. Although not necessarily limited to a particular type of PCP pump, a simplified PCP pump is depicted in FIG. 3 with corresponding dimensions listed in FIG. 4.

In addition, a suitable pump means 18 may include one or more known submersible pumps rated for operation at depths of at least about 2134 meters (about 7000 feet). In still another embodiment, the system 10 may include a pump operational at varying depths up to about 4572 meters (about 15,000 feet) and/or at a hydrostatic pressure up to about 463 bar (about 6708 psi). An apposite pump 18 is commercially available from NETZSCH Pumps North America, LLC, model NTZ 450240DT74 or equivalent, powered by a subsea drill motor 16 in subsea environments. Comparable pumps may be acquired by other like manufacturers.

Suitably, the drill motor 16 and pump means 18 are coupled in a manner effective for the drill motor 16 to operationally power the pump means 18 in subsea environments, including deep water and ultra deep water environments. In operation, fluid is directed to the drill motor 16 creating eccentric motion in the power section 31 of the drill motor 16, which is transferred as concentric power to the pump means 18. Due to the high hydrostatic pressure of subsea environments, the drill motor 16 and pump means 18 are suitably sealed about a drive shaft connection between the drill motor 16 and pump means 18 in a manner effective (1) to seal the drill motor 16 and pump means 18 against localized hydrostatic pressure that may otherwise cause system 10 failure or decrease system 10 efficiency, and (2) to prevent the fluid being pulled through the pump means 18 from escaping into the subsea ambient environment, e.g., hydrocarbons leaking into the subsea ambient environment.

Figure 5:
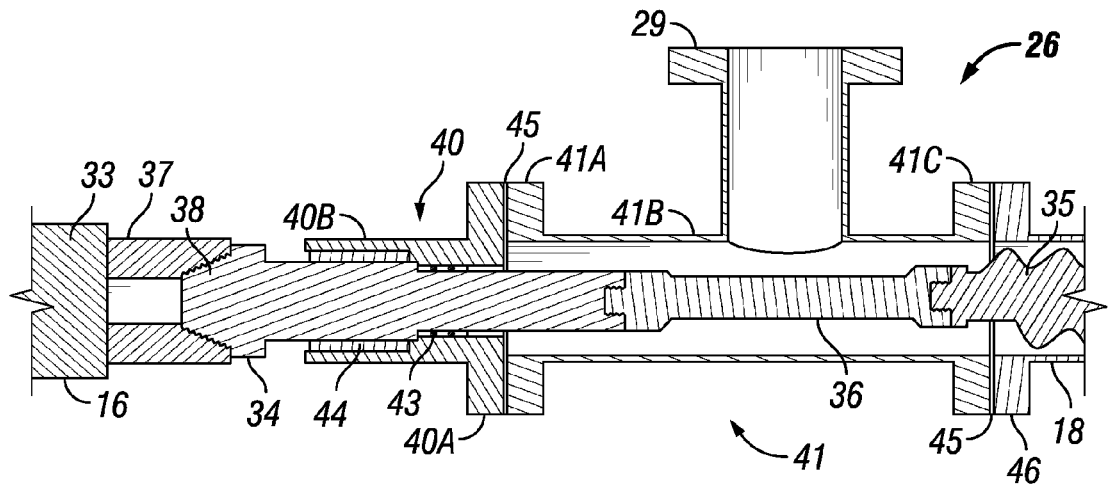
FIG. 5 illustrates one simplified embodiment of a subsea coupling assembly of the present system.

Turning to FIG. 5, the drill motor 16 and pump means 18 are suitably coupled in-line via a coupling assembly 26 operationally configured to translate the rotation and gyration of the rotor 35 of the pump means 18 to the true rotation of the drive shaft 34 of the drill motor 16 eliminating any unbalanced movement associated with the rotor 35, while also sealing the drill motor 16 and pump means 18 from external ambient pressure. As shown, the coupling assembly 26 suitably includes (1) a drive shaft 34 releasably attachable to the drill motor 16, (2) a first sealing member 40 operationally configured to receive the drive shaft 34 to form a seal along the drive shaft 34, and (3) a second sealing member 41 releasably attachable to the first sealing member 40 at a first end and releasably attachable to the pump means 18 at a second end, the second sealing member 41 being operationally configured to form a seal at the pump means 18. In this embodiment, the first sealing member 40 is defined by an end flange 40A and a tubular section 40B, the longitudinal axis of the tubular section 40B being substantially perpendicular to the plane of the flange 40A. The second sealing member 41 is defined by a first flange 41A, a tubular section 41B, and a second flange 41C, the longitudinal axis of the tubular section 41B being substantially perpendicular to the plane of flanges 41A and 41C. Suitably, flanges 40A and 41A are joined to tubular sections 40B and 41B via welds. In another embodiment, the sealing members 40, 41 may be mold formed as desired.

Regarding the drill motor 16, the inner diameter of the collar 37 is defined by a tapered female thread wherein the threaded nose 38 of the drive shaft 34 may be threadedly connected to the drill motor 16 to form a seal there between. In addition, the inner surface of the tubular section 40B is defined by one or more high pressure seals 43 and one or more bushings 44 effective to form seals between the first sealing member 40 and the drive shaft 34 during system 10 operation. The number of seals and bushings may be modified as desired or as otherwise required, e.g., depending on the hydrostatic pressure for a particular system 10 or other performance requirements. As shown, the first sealing member 40 includes a length less than the drive shaft 34 the first sealing member 40 being set between the opposing ends of the drive shaft 34, wherein the second end of the drive shaft 34 extends out from the end flange 40A in a manner effective for further coupling to the pump means 18. Although not necessarily limited to a particular material of construction, a suitable bushing 44 includes a non-metallic bushing, also referred to as a sleeve bearing, commercially available from Trelleborg Sealing Solutions, Streamwood, Ill., or other like manufacturers. Suitable high pressure seals 43 include, but are not necessarily limited to U-cup-type seals as understood by persons of ordinary skill in the art of seals. One suitable U-cup-type seal may be constructed at least in part from polytetrafluoroethylene (PTFE). In one particular embodiment, the high pressure seals 43 may include a combination of U-cup-type seals and o-ring energizers.

In one embodiment, the drive shaft 34 may be coupled directly to the pump rotor 35. As illustrated in FIG. 5, the drive shaft 34 may also be coupled to the rotor 35 of the pump means 18 via a flexible drive shaft 36 that is operationally configured to absorb the eccentric rotation of the pump rotor 35 and allow the rotor drive systems of the drill motor 16 and pump means 18 to turn true center during system 10 operation.

The outer faces of flanges 40A and 41A are operationally configured to abut face-to-face wherein the bolt holes of each flange are aligned to receive bolts there through for securing the second sealing member 41 to the first sealing member 40. Suitable flanges of the system 10 meet the standard requirements of the American National Standards Institute (ANSI) as of the time of the filing of this application. As stated previously, the system 10 may be built to scale. Thus, the size and type of flanges employed may change as necessary. In an embodiment for subsea applications, one suitable flange includes, but is not necessarily limited to a Series 900 adapter flange as understood by persons of ordinary skill in the art of pipe fitting.

In addition, gasket material 45 may be inserted between flanges 40A and 41A to further assist sealing the coupling assembly 26 during system 10 operation. Suitable gasket material 45 includes pressure responsive ring gaskets constructed from material, including but not necessarily limited to metal, rubber, PTFE, plastic, and combinations thereof. In a particularly advantageous embodiment, the gasket material 45 includes a spiral wound flange meeting the standard requirements of the ANSI. Suitably, any gasket material 45 used corresponds to the flanges employed. For example, in subsea applications using Series 900 adapter flanges, a suitable gasket material 45 may include Pressure Class 900 spiral wound gaskets constructed from steel.

Still referring to FIG. 5, the opposing flange 41C of the second sealing member 41 is secured to a pump adapter flange 46 at a first end of the stator housing of the pump means 18 for forming a seal between the pump means 18 and the coupling assembly 26. In one embodiment, the pump adapter flange 46 may be welded to the stator housing of the pump means 18. In another embodiment, the pump adapter flange 46 may be secured to the stator housing of the pump means 18 via a threaded connection. In still another embodiment, the pump adapter flange 46 and corresponding stator housing may be mold formed. As discussed above, gasket material 45 may be employed for further sealing between flanges 41C and 46.

Figure 6A:
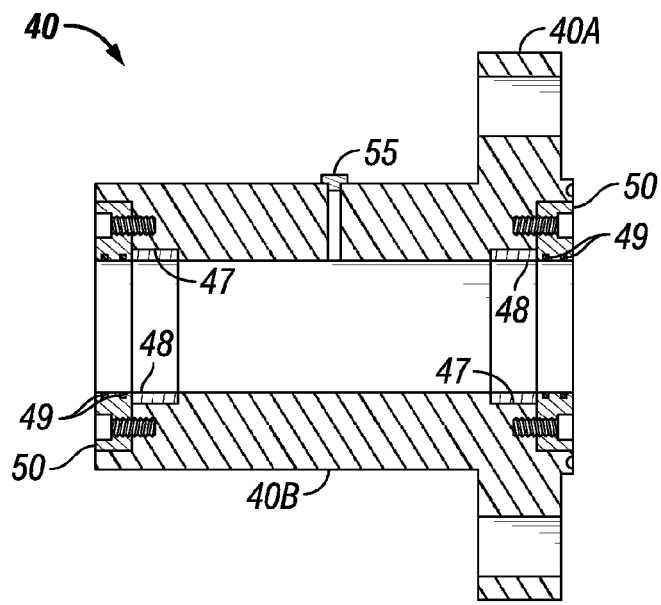
FIG. 6A illustrates one simplified embodiment of a first sealing member of a subsea coupling assembly of the present system.

In an embodiment of the coupling assembly 26 as depicted in FIGS. 6A-6C, the first sealing member 40 is operationally configured to provide a seal with the drive shaft 34 running axially there through at or near the open ends of the first sealing member 40. In this embodiment, the open ends of the first sealing member 40 include bearing seats 47 near each opening for receiving bearings 48 therein. Once the bearings 48 are installed, bearing plates 50 including high pressure seals 49 may be installed to maintain the bearings 48 in place while also providing an additional sealing element about the drive shaft 34 during system 10 operation. In this embodiment, the bearings 48 suitably include thrust bearings operationally configured to assist with maintaining the drive shaft 34 turning true center and to limit vibration of the coupling assembly 26 during system 10 operation. Once sealed, the coupling assembly 26 may also be pressurized as desired.

Although not necessarily limited to a particular material of construction, the first and second sealing members 40, 41, drive shaft 34 and flexible drive shaft 36 are suitably constructed from metals, composite materials, and combinations thereof. In one embodiment, the first and second sealing members 40, 41, drive shaft 34 and flexible drive shaft 36 are constructed from steel. In a particularly advantageous embodiment, the first and second sealing members 40, 41, drive shaft 34 and flexible drive shaft 36 are constructed from one or more of 4130 and 4140 alloy steel.

The pump means 18 has an inlet for receiving fluid drawn to the pump means 18 during system 10 operation. Suitably, the inlet lies along the stator housing of the pump means 18 near the distal end of the rotor 35. Fluid pulled through the pump 18 is directed toward the surface via an outlet positioned near the first end of the stator housing of the pump means 18.

In one embodiment, the pump means 18 may be directly connected to a subsea fluid source 12. As shown in FIG. 1, a separator means 20 may be incorporated into the system 10 between the pump means 18 and the fluid source 12 for removing one or more subsea target fluids from the fluid stream prior to the fluid stream reaching the pump means 18. For example, exposure to continuous volumes of gas in the fluid stream may ultimately damage or otherwise compromise the integrity of the pump means 18. Thus, in system 10 operation where the target fluid comprises gas, a separator means 20 may be employed for separating gaseous material from flowable non-gaseous fluids in a fluid stream prior to the non-gaseous fluids flowing to the pump means 18.

Figure 7:
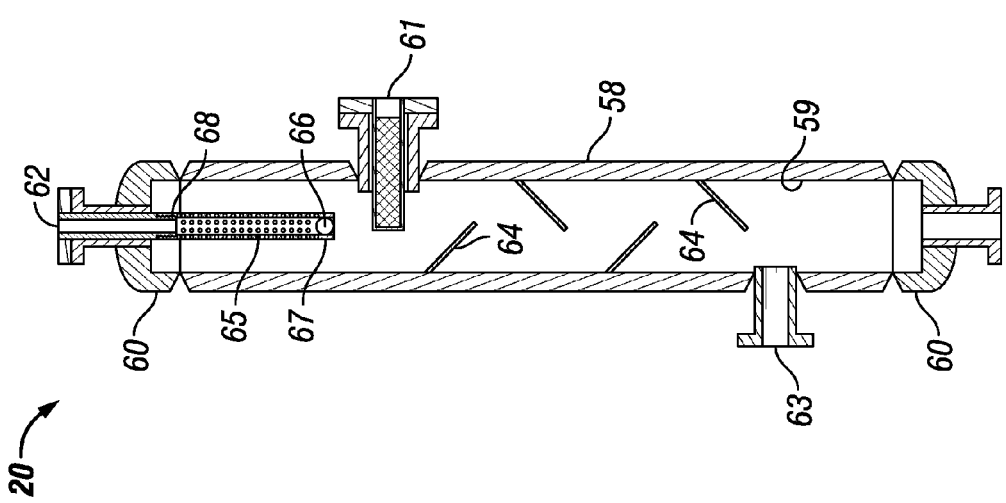
FIG. 7 illustrates a sectional view of a simplified embodiment of a subsea separator means of the present system.

A suitable separator means 20 includes a liquid/vapor separator operationally configured to separate multi-phase fluids, for example, hydrocarbon products from associated solids and water. In particular, a suitable separator means 20 is operationally configured to separate a gas phase from a liquid phase and/or an oil phase from a water phase. A suitable separator means 20 may also be built to scale according to the depth of operation and/or fluid separation requirements of the system 10. In one embodiment, a suitable separator means 20 may include a subsea separator or subsea gas buster as understood to persons of ordinary skill in the art of petroleum operations (FIG. 7). Although separators such as gas busters are typically used to vent out gas in return lines to prevent gas from entering a liquid holding tank, here the separator 20 is suitably located upstream of a pump means 18 and operationally configured to vent out gas from a fluid stream to prevent gas in the fluid from flowing to the pump means 18.

With reference to FIG. 7, an exemplary subsea separator 20 is provided. The separator 20 includes a housing defined by an outer surface 58 and an inner surface 59, end caps 60, a fluid inlet 61, a gas outlet 62, and a non-gaseous outlet 63. In operation, the separator 20 is suitably oriented in a manner wherein the fluid inlet 61 is located higher in altitude than the non-gaseous outlet 63 so that fluid entering the fluid inlet 61 may flow downward within the separator 20 via gravity toward the bottom of the separator 20. As desired, the separator 20 may include one or more baffles 64 or other deflector means operationally configured to promote separation of gases from non-gaseous fluid as the fluid flows toward the bottom of the separator 20. As gas separates from non-gaseous fluid the gas suitably rises toward the top of the separator 20 where the gas may be vented out of the separator 20 via gas outlet 62. Non-gaseous fluids suitably flow out of the separator 20 via the non-gaseous outlet 63.

In a particularly advantageous embodiment, the separator 20 includes a sealing means provided as a ball valve assembly comprised of a perforated tube 65 in fluid communication with the gas outlet 62 and a ball 66 housed within the tube 65, the ball 66 being operationally configured to rise according to the level of non-gaseous fluid once the volume of non-gaseous rises to a level about equal to the terminal end 67 of the tube 65. Although not limited to a particular material, a suitable ball 66 is provided as a solid object constructed from one or more materials effective for the ball 66 to substantially float atop the target fluid within the separator 20 and withstand internal fluid pressure while also forming a seal of the separator 20 at gas outlet 62. For salt water applications, if a prospective ball 66 floats on fresh water, the ball 66 will necessarily work in a salt water environment. A suitable ball 66 is constructed from one or more materials effective to withstand an internal fluid pressure up to about 690 bar (about 10000 psi). A suitable ball 66 is constructed from one or more metals, plastics, rubbers, composite materials, and combinations thereof. In deep water or ultra deep water operation, a suitable ball 66 may be constructed from PTFE. In another deep water or ultra water operation, a suitable ball 66 may be constructed from ultra-high-molecular-weight polyethylene ("UHMW"). In a particularly advantageous embodiment, the ball 66 is operationally configured to float on methanol and methanol based solutions.

As fluid rises within the separator 20, once the non-gaseous fluid comes into contact with the ball 66 housed within the perforated tube 65 the ball 66 is effective to float on the surface of the non-gaseous fluid and rise and lower within the tube 65 according to the non-gaseous fluid level within the separator 20. In a situation where non-gaseous fluid fills the separator 20, the ball 66 is operationally configured rise to the top of the tube 65 and mate to a seat 68 at the opening of the gas outlet 62 forming an effective seal against substantially any discharge of non-gaseous fluid through the gas outlet 62. As the fluid level within the separator 20 drops, the ball 66 lowers opening the outlet 62 for further venting of gas from the separator 20. As depicted in FIG. 1, non-gaseous fluids are discharged from the separator 20 through the outlet 63 to the pump 18, and from the pump 18 to the surface platform 14.

The conduit 25 in fluid communication with the fluid inlet 61 and conduit 24 in fluid communication with the non-gaseous outlet 63 suitably include heavy wall pipe suitable for deep water and ultra deep water applications. Suitable gas conduits 23 include, but are not necessarily limited to coiled tubing, subsea umbilicals, and combinations thereof suitable for deep water and ultra deep water applications.

Figure 8:
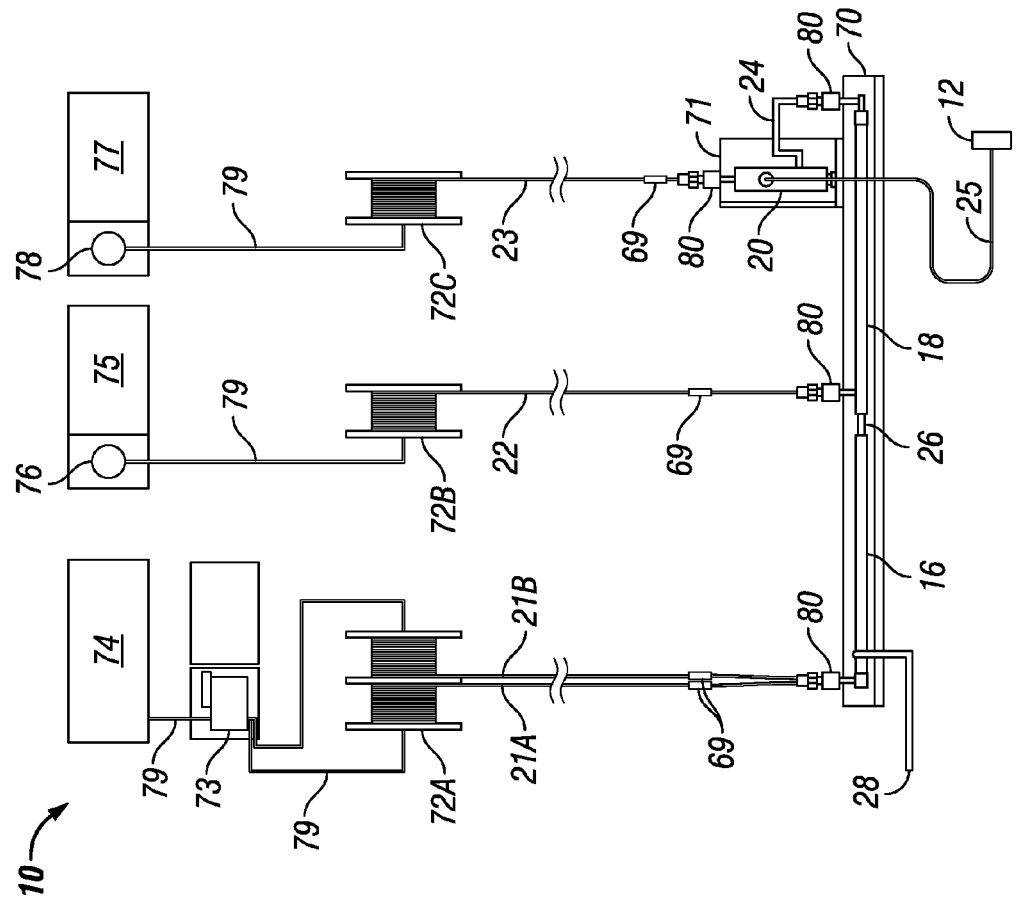
FIG. 8 illustrates another simplified embodiment of the present system.

Turning to FIG. 8, an exemplary system 10 operationally configured for fluid recovery in deep water and ultra deep water applications is provided. As shown, the drill motor 16, pump means 18 and separator means 20 are supported by a framework 70 or "skid" as commonly referred to by persons of ordinary skill in the art of subsea pumping operations. Suitably, the drill motor 16 and pump means 18 are bolted to the framework 70, although other fastening means is contemplated.

During subsea installation of the system 10, the framework 70 housing the drill motor 16 and pump means 18 may be lowered to a target location on the sea floor. Thereafter, the separator means 20, suitably housed within its own support framework 71, may be lowered and stacked or releasably fastened to the framework 70 as shown. In another embodiment, the separator means 20 and accompanying framework 71 may be releasably fastened to the framework 70 prior to subsea installation. As depicted in FIG. 1, the separator means 20 may be installed separately and set apart from the drill motor 16 and pump means 18.

Figure 12:
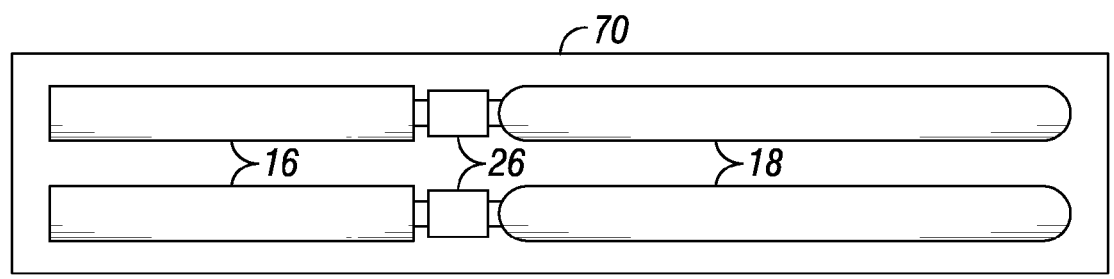
FIG. 12 illustrates a simplified top view of dual prime movers, coupling assemblies, and pump means as oriented within a skid.

The system 10 of FIG. 8 includes a total of four drops, i.e., conduits 21A, 21B, 22, and 23. Conduits 21A and 21B serve as dual fluid feeds to dual drill motors 16 (an example of dual drill motors 16 and corresponding pump means 18 is depicted in FIG. 12). Conduit 22 lies in fluid communication with the pump means 18 and serves as a return line for non-gaseous fluid recovered from the fluid source 12. Conduit 23 lies in fluid communication with the separator means 20 and serves as a return line for any gas recovered from the fluid source 12. Each of the three sets of drops originate from corresponding coil reels 72A-72C located on a surface platform 14 with conduits 21A and 21B originating from a dual coil real 72A as shown. Coil reel 72A lies in fluid communication with surface pump 73 operationally configured to pump fluid from a fluid storage container 74 to the drill motor 16. In offshore operations, the surface pump 73 may draw water directly from the surrounding sea water and/or from a surface fluid storage container 74. Suitably, the surface pump 73 may include any commercially available positive displacement pump operationally configured to provide adequate power to the drill motor 16 during system 10 operation. A suitable surface pump 73 may include the HT-400 pump available from Halliburton, Houston, Tex., U.S.A. or equivalent. In a particularly advantageous embodiment, the surface pump 73 may include a modified Halliburton HT-400 pump with a 755 horsepower Cat C-18 engine, or equivalent.

Depending on the particular system 10 operation, coil reel 72B may lie in fluid communication with a non-gaseous storage container 75 at the surface, or in the alternative, a separator 76 may be included to separate out particular fluids from the fluid stream prior to storing fluid in a surface fluid storage container 75. Likewise, coil reel 72C may lie in fluid communication with a surface non-gaseous fluid storage container 77 or a separator 78 as desired.

A suitable conduit for use with coil reels includes coiled tubing as common in petroleum operations. Although the system 10 may be built to scale, suitable coiled tubing for subsea system 10 applications has an outer diameter ranging from about 3.81 cm to about 7.4 cm (about 1.5 inches to about 2.9 inches). In the embodiment of the system 10 shown in FIG. 8, suitable coiled tubing includes an outer diameter of about 6.05 cm (about 2.38 inches). Suitable platform conduit 79, i.e., surface platform plumbing, includes, but is not necessarily limited to high pressure steel pipe, high pressure flexible couplings, and combinations thereof.

Depending on the depth of the skid 70, conduits 21A, 21B, 22, 23 may be provided entirely as coiled tubing. As illustrated in FIG. 8, conduits 21A, 21B, 22, 23 may include coiled tubing to a predetermined depth, where after the conduits transition over to hose material at connectors 69, the hose material being effective for linking the conduits to the drill motor 16, pump means 18, and separator means 20. In deep water and ultra deep water installations requiring use of a remotely operated underwater vehicle ("ROV"), hose material may be less difficult for the ROV to control than coiled tubing when connecting the various conduits to the drill motor 16, pump means 18, and separator means 20. In deep water and ultra deep water applications, up to about 45 m (about 150 feet) of hose material may be employed although the actual length may vary according to the depth of water, currents, and other environmental concerns. Suitable connectors 69 include, but are not necessarily limited to slip connectors as understood by persons of ordinary skill in the art of drilling operations.

Although not necessarily limited to a particular type of connection, each of the conduits 21A, 21B, 22, 23, are suitably joined to the drill motor 16, pump means 18, and separator means 20 via emergency quick disconnects 80, commonly referred to as "hot stabs" by persons of ordinary skill in the art of subsea pumping operations. In one aspect, suitable emergency quick disconnects 80 are operationally configured to prevent ambient water ingress into the drill motor 16, pump means 18, and separator means 20 during system 10 operation. In another aspect, the emergency quick disconnects 80 are operationally configured to allow the respective conduits to release from each of the drill motor 16, pump means 18, and separator means 20, allowing the conduits 21A, 21B, 22, 23 and the surface platform 14 to release from the subsea skid 70. In operation, the emergency quick disconnects 80 are operationally configured to release the attached conduit, e.g., via an electric signal or an acoustic signal initiated from the surface. Although the system 10 may be built to scale, including the emergency quick disconnects 80, suitable disconnects range in size from about 5.08 cm to about 10.16 cm (about 2.0 inches to about 4.0 inches) as commercially available from Oceaneering International, Inc., located in Houston, Tex., U.S.A.

As stated above, the present system 10 may be employed to remove hydrate plugs from subsea gas transmission pipelines by employing depressurization of a target pipeline 12 downstream of a hydrate plug. A simplified illustration of a system 10 operationally configured for deep water and ultra deep water hydrate remediation operations is provided in FIG. 9 including dual drill motors 16 and pump means 18 as depicted in the simplified illustration of FIG. 12. In this embodiment, the surface platform 14 is provided in the form of a surface vessel, for example, a boat carrying the necessary surface equipment such as the surface pump 73, the coil reels 72A-72C, separators 76, 78 (not shown), and storage containers (only 77 shown here).

Figure 9:
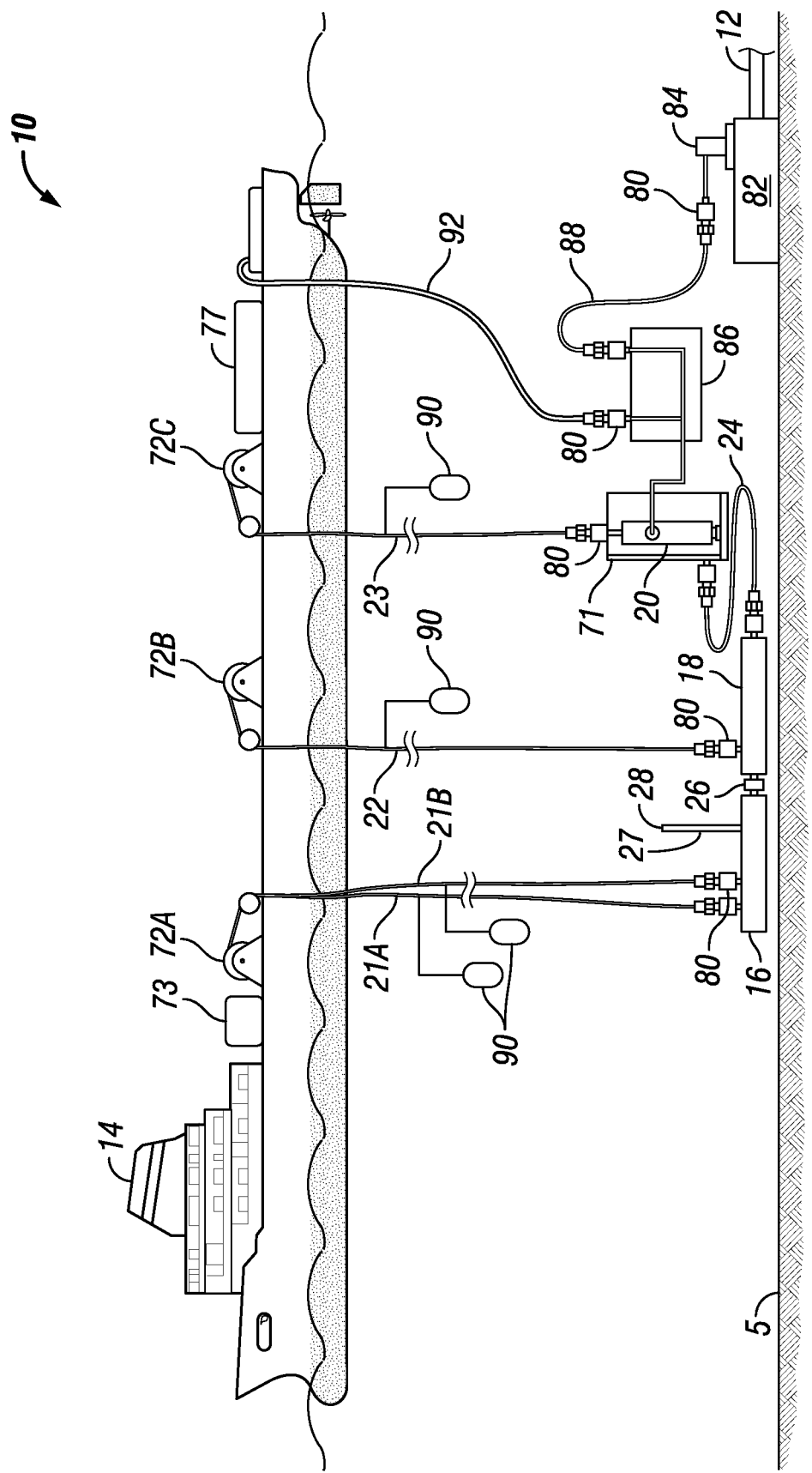
FIG. 9 illustrates another simplified embodiment of the present system.

During hydrate remediation operations, the system 10 is suitably lowered to the seafloor 5 where the system 10 ties in at a terminal end of a pipeline 12, although the system 10 may be configured to tie in at a particular point along the length of the pipeline 12. As depicted in FIG. 9, the separator means 20 may be installed along the seafloor 5 as a separate free standing component of the system 10 wherein the separator means 20 is housed within framework 71 for supporting the separator means 20 on the seafloor 5. In the alternative, the separator means 20 and frame 71 may be stacked atop the skid 70 as shown in FIG. 8. As stated, the separator means 20 (and frame 71) may be stacked atop the skid prior to subsea installation. In another implementation, the separator means 20 (and frame 71) may be stacked atop the skid 70 once installed subsea. For hydrate remediation purposes, the separator means 20 may be fit with a subsea manifold 86 operationally configured to (1) receive a plurality of conduits each carrying one or more fluids and (2) control the flow of the fluid to the separator means 20. For ease of installation, the manifold 86 is suitably attached to frame 71 although other configurations may be employed as desired.

As understood by persons of ordinary skill in the art, a typical subsea pipeline 12 terminates at PLET 82—a structure that provides a connection of the pipeline 12 to other system 10 components. A suitable PLET 82 includes a foundation that vertically supports the pipeline 12, the weight of one or more end connectors, and any valves employed. As shown, the PLET 82 may also include a hub connector 84, a vertical connector or similar device operationally configured to act as a tie-in connection between the pipeline 12 and the subsea system 10 components. Although the present system 10 is not necessarily limited to any particular type of hub connector 84, a suitable hub connector 84 is commercially available from Cameron, Houston, Tex., U.S.A.

Once the skid 70 is installed at the seafloor 5, conduits 21A, 21B, 22 and 23 may be installed subsea and attached to the drill motor 16, pump means 18, and separator means 20 by one or more divers or ROVs depending on the depth of the skid 70. Once the separator means 20 is fluidly connected to the pump means 18, the one or more divers or ROVs may also fluidly connect the PLET 82 to the manifold 86 via conduit 88. As depicted in FIG. 9, hot stabs 80 may be employed at the point of connection of the terminal ends of the various conduits. In addition, one or more of the conduits 21A, 21B, 22 and 23 may be fit with one or more clump weights 90 operationally configured to assist in maintaining the conduits in a substantially vertical orientation during system 10 operation.

Once the subsea system 10 components are installed, sea water stored on the boat 14 or otherwise pumped aboard the boat 14 from the surrounding water may then be pumped down through conduits 21A and 21B to power the subsea drill motors 16 fluidly connected to conduits 21A and 21B. Once the sea water has effectively powered the drill motors 16, the system 10 is operationally configured to discharge spent sea water into the ambient subsea environment via one or more outlets 28. By discharging spent sea water into the ambient subsea environment, the system 10 does not have to overcome hydrostatic pressure typically associated with returning motor fluids back to the water surface, providing for a more efficient operation of the drill motors 16 and realizing greater fluid returns via conduits 22 and 23.

In operation, the drill motors 16 act as prime movers for the corresponding pump means 18, which in one aspect are effective for forming a vacuum on the pipeline 12 resulting in the flow of pipeline 12 fluids and hydrates into conduit 88. As shown in FIGS. 1 and 9, the separator means 20 is positioned between the pump means 18 and the pipeline 12, such that the prime movers and pump means 18 can be effective to decrease pressure in the system, from the pump means 18, through the separator means 20 and within the pipeline 12, for resulting in the flow of the pipeline 12 fluids. As FIG. 9 illustrates, the manifold 86 is operationally configured to receive pipeline 12 fluid and one or more other fluids as desired. For hydrate remediation purposes, the manifold 86 may be operationally configured to receive at least a methanol line 92 whereby methanol is directed into the separator means 20 along with the pipeline 12 fluid, the methanol being operationally configured to prevent hydrate formation within the separator means 20. As desired, methanol may be fed to the manifold 86 from the surface platform 14 as shown, or in the alternative, a subsea tank or bladder may be employed to feed methanol to the manifold 86 via the methanol line 92.

Figure 10A:
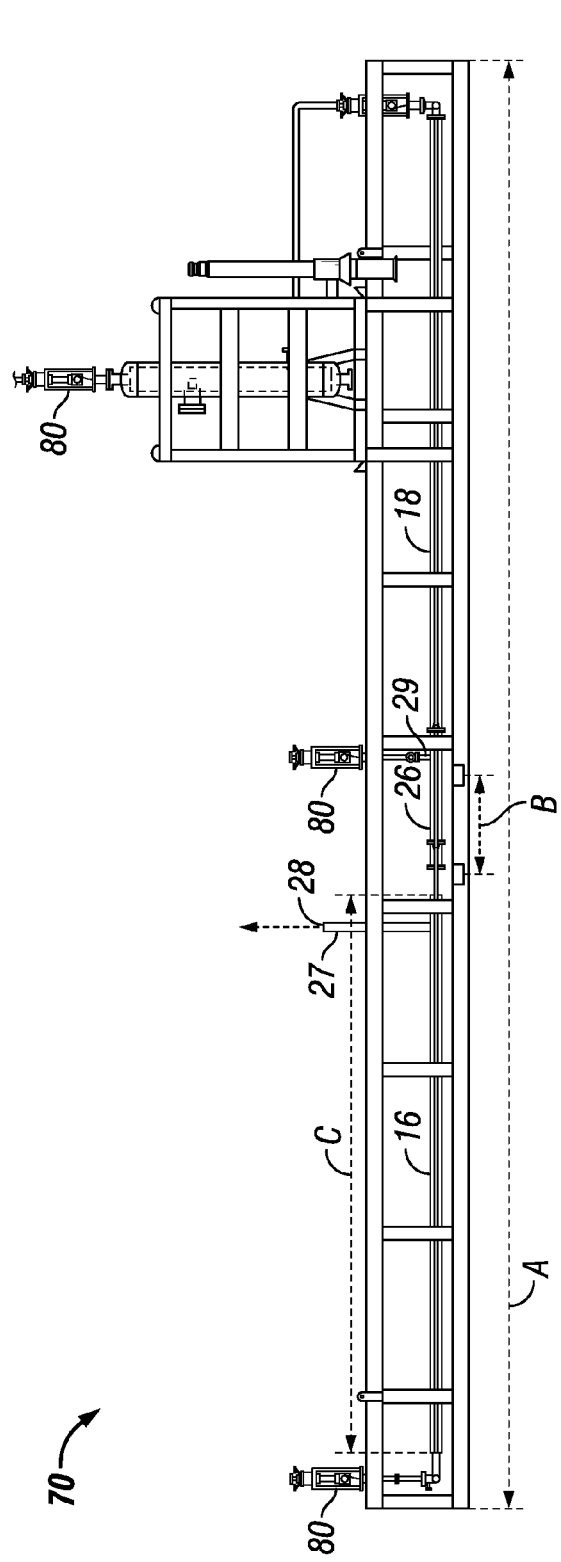
FIG. 10A illustrates a side view of a simplified embodiment of a subsea skid and various subsea components of the present system.
Figure 10B:
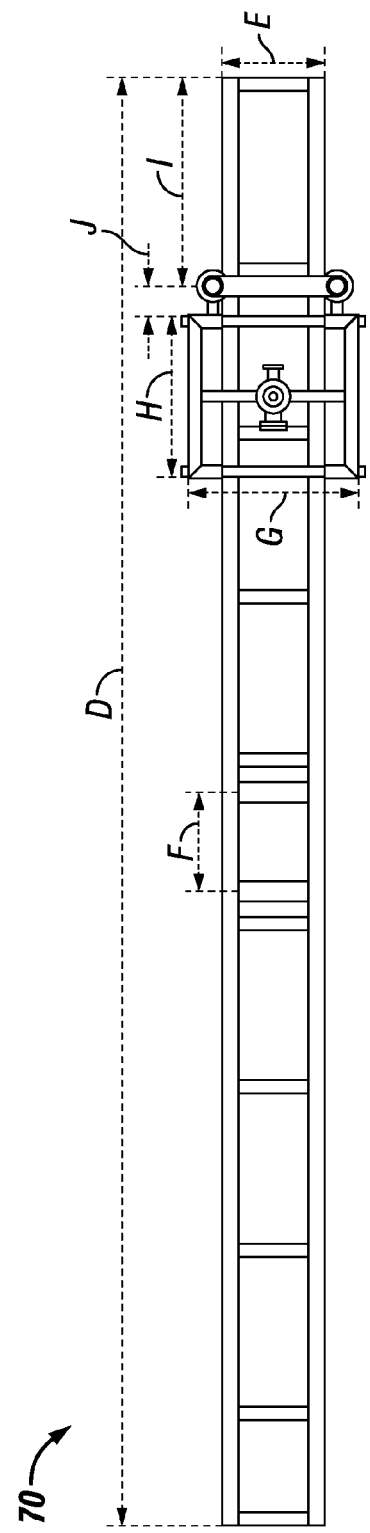
FIG. 10B illustrates a top view of the skid of FIG. 10A.

FIGS. 10A-10C depict a simplified skid 70 operationally configured for subsea operations such as hydrate remediation in deep water and ultra deep water. Dimensional information related to the skid 70 of FIGS. 10A-10C is provided below in Table 5.

TABLE 5

| | Distance | |
|---|---|---|
| FIG. 10A | A | About 21.6 m (about 70.9 feet) |
| | B | About 1.5 m (about 5.0 feet) |
| | C | About 8.3 m (about 27.3 feet) |
| FIG. 10B | D | About 21.6 m (about 70.9 feet) |
| | E | About 1.5 m (about 5.0 feet) |
| | F | About 1.5 m (about 5.0 feet) |
| | G | About 2.4 m (about 8.0 feet) |
| | H | About 2.4 m (about 8.0 feet) |
| | I | About 3.11 m (about 10.19 feet) |
| | J | About 0.38 m (about 1.26 feet) |
| FIG. 10C | K | About 5.3 m (about 17.4 feet) |

With reference to FIGS. 11A-11F, dimensional information related to a suitable deep water and ultra deep water separator means 20 is listed in Table 6.

TABLE 6

| | Distance | |
|---|---|---|
| FIG. 11A | A | About 277 cm (about 109 inches) |
| | B | About 91.7 cm (about 36.1 inches) |
| | C | About 73.9 cm (about 29.1 inches) |
| | D | About 96.2 cm (about 37.88 inches) |
| | E | About 35.1 cm (about 13.81 inches) |
| | F | About 45.7 cm (about 18 inches) |
| | G | About 35.1 cm (about 13.81 inches) |
| | H | About 53.8 cm (about 21.19 inches) |
| | I | About 2.97 cm (about 1.17 inches) |
| | J | About 81.3 cm (about 32 inches) |
| | K | About Ø 23.8 cm (about Ø 9.38 inches) |
| | L | About 16.2 cm (about 6.38 inches) |
| | M | About 16.2 cm (about 6.38 inches) |
| FIG. 11B | A | About Ø 50.8 cm (about Ø 20 inches) |
| | B | About Ø 35.6 cm (about Ø 14 inches) |
| FIG. 11C | A | About Ø 2.0 cm (about Ø 0.79 inches) |
| | B | About Ø 1.4 cm (about Ø 0.55 inches) |
| | C | About Ø 16.2 cm (about Ø 6.38 inches) |
| | D | About 1.0 cm (about 0.39 inches) |
| | E | About 0.438 cm (about 0.17 inches) |
| FIG. 11D | A | About 30.5 cm (about 12 inches) |
| | B | About 4.44 cm (about 1.75 inches) |
| | C | About 15.9 cm (about 6.25 inches) |
| | D | About 29.2 cm (about 11.5 inches) |
| | E | About 10.16 cm (about 4.00 inch) ANSI 900# Long Weld Neck Flange |
| FIG. 11E | A | About 38.1 cm (about 15 inches) |
| | B | About 24.77 cm (about 9.75 inches) |
| | C | About 5.6 cm (about 2.19 inches) |
| | D | About 30.5 cm (about 12 inches) |
| | E | About 15.2 cm (about 6.00 inch) ANSI 900# Long Weld Neck Flange |
| FIG. 11F | A | About 11.43 cm (about 4.5 inches) |
| | B | About 50.8 cm (about 20 inches) |
| | C | About 15.2 cm (about 6.00 inch) ANSI 900# Blind Flange |
| | D | About 10.2 cm (about 4 inches) Pipe |
| | E | Drill as many holes as possible; each hole about Ø 0.16 cm (about Ø 0.063 inches) |

Suitably, the separator means 20 is constructed from a metal or metal alloy including, but not necessarily limited to carbon steel. In the embodiment of FIGS. 11A-11F, the separator means 20 may be constructed from 4130 alloy steel. In the embodiment of FIGS. 11A-11F, the inner diameter of the separator means 20 is about 35.6 cm (about 14 inches), and the outer diameter of the separator means 20 is about 50.8 cm (about 20 inches). As shown, separator means 20 may include one or more baffles extending from the inner surface 59 in a manner effective to deflect or otherwise contact fluid within the separator means 20.

The invention will be better understood with reference to the following non-limiting example, which is illustrative only and not intended to limit the present invention to a particular embodiment.

Example 1

In a first non-limiting example, a system 10 as described in FIGS. 9-11F was put through system integration testing ("SIT"). The test was performed on dry land whereby the skid 70 (including system 10 components) was set on substantially level surface and the system 10 was fluidly connected to a 11924 liter (hundred barrel) tank of water to be pulled through the system 10, the water being recirculated through the system 10 back to the tank for reuse during testing. In addition, choke pressure was tied into the system 10 to simulate subsea hydrostatic pressure. The system 10 was run continuously for 24 hours starting at 8:00 a.m. Tables 7 and 8 provide test data of the SIT.

TABLE 7

| Time | Surface Pump Inlet (LPM) | Surface Pump Pressure | Choke Pressure | Sub-Sea Pump RPM | Sub-Sea Pump Returns (LPM) | Total Liters Collected |
|---|---|---|---|---|---|---|
| 09:00 | 357.7 | 6.9 Bar | 0 Bar | 147 | 90.9 | 90.9 |
| 10:00 | 357.7 | 27.6 Bar | 41.4 Bar | 335 | 174.1 | 4179.1 |
| 11:00 | 715.4 | 34.5 Bar | 117.2 Bar | n/a | 162.8 | 14789.6 |
| 12:00 | 715.4 | 34.5 Bar | 117.2 Bar | n/a | 162.8 | 24555.9 |
| 13:00 | 715.4 | 34.5 Bar | 117.2 Bar | n/a | 162.8 | 34322.3 |
| 14:00 | 715.4 | 34.5 Bar | 117.2 Bar | n/a | 162.8 | 44175.8 |
| 15:00 | 715.4 | 34.5 Bar | 117.2 Bar | n/a | 162.8 | 53855.1 |
| 16:00 | 715.4 | 34.5 Bar | 117.2 Bar | n/a | 162.8 | 63621.4 |
| 17:00 | 715.4 | 34.5 Bar | 117.2 Bar | n/a | 162.8 | 73387.8 |
| 18:00 | 715.4 | 34.5 Bar | 117.2 Bar | n/a | 162.8 | 83154.1 |
| 19:00 | 715.4 | 34.5 Bar | 117.2 Bar | n/a | 162.8 | 92920.5 |
| 20:00 | 715.4 | 34.5 Bar | 117.2 Bar | n/a | 162.8 | 102686.9 |
| 21:00 | 715.4 | 34.5 Bar | 117.2 Bar | n/a | 162.8 | 112453.2 |
| 22:00 | 715.4 | 34.5 Bar | 117.2 Bar | n/a | 162.8 | 122219.6 |
| 23:00 | 715.4 | 34.5 Bar | 117.2 Bar | n/a | 162.8 | 131985.9 |
| 24:00 | 715.4 | 34.5 Bar | 117.2 Bar | n/a | 162.8 | 141752.3 |
| 01:00 | 715.4 | 34.5 Bar | 117.2 Bar | n/a | 162.8 | 151518.7 |
| 02:00 | 715.4 | 34.5 Bar | 117.2 Bar | n/a | 162.8 | 161285 |
| 03:00 | 715.4 | 34.5 Bar | 117.2 Bar | n/a | 162.8 | 171051.4 |
| 04:00 | 715.4 | 34.5 Bar | 117.2 Bar | n/a | 162.8 | 180817.8 |
| 05:00 | 715.4 | 34.5 Bar | 117.2 Bar | n/a | 162.8 | 190584.1 |
| 06:00 | 715.4 | 34.5 Bar | 117.2 Bar | n/a | 162.8 | 200350.5 |
| 07:00 | 715.4 | 34.5 Bar | 117.2 Bar | n/a | 162.8 | 210116.9 |
| 08:00 | 715.4 | 34.5 Bar | 117.2 Bar | n/a | 162.8 | 219883.2 |

TABLE 8

| Time | Surface Pump Inlet (BPM) | Surface Pump Pressure | Choke Pressure | Sub-Sea Pump RPM | Sub-Sea Pump Returns (GPM) | Total Gallons Collected |
|---|---|---|---|---|---|---|
| 09:00 | 3 | 100 PSI | 0 PSI | 147 | 24 | 24 |
| 10:00 | 3 | 400 PSI | 600 PSI | 335 | 46 | 1104 |
| 11:00 | 6 | 500 PSI | 1700 PSI | n/a | 43 | 3907 |
| 12:00 | 6 | 500 PSI | 1700 PSI | n/a | 43 | 6487 |
| 13:00 | 6 | 500 PSI | 1700 PSI | n/a | 43 | 9067 |
| 14:00 | 6 | 500 PSI | 1700 PSI | n/a | 43 | 11670 |
| 15:00 | 6 | 500 PSI | 1700 PSI | n/a | 43 | 14227 |
| 16:00 | 6 | 500 PSI | 1700 PSI | n/a | 43 | 16807 |
| 17:00 | 6 | 500 PSI | 1700 PSI | n/a | 43 | 19387 |
| 18:00 | 6 | 500 PSI | 1700 PSI | n/a | 43 | 21967 |
| 19:00 | 6 | 500 PSI | 1700 PSI | n/a | 43 | 24547 |
| 20:00 | 6 | 500 PSI | 1700 PSI | n/a | 43 | 27127 |
| 21:00 | 6 | 500 PSI | 1700 PSI | n/a | 43 | 29707 |
| 22:00 | 6 | 500 PSI | 1700 PSI | n/a | 43 | 32287 |
| 23:00 | 6 | 500 PSI | 1700 PSI | n/a | 43 | 34867 |
| 24:00 | 6 | 500 PSI | 1700 PSI | n/a | 43 | 37447 |
| 01:00 | 6 | 500 PSI | 1700 PSI | n/a | 43 | 40027 |
| 02:00 | 6 | 500 PSI | 1700 PSI | n/a | 43 | 42607 |
| 03:00 | 6 | 500 PSI | 1700 PSI | n/a | 43 | 45187 |
| 04:00 | 6 | 500 PSI | 1700 PSI | n/a | 43 | 47767 |
| 05:00 | 6 | 500 PSI | 1700 PSI | n/a | 43 | 50347 |
| 06:00 | 6 | 500 PSI | 1700 PSI | n/a | 43 | 52927 |
| 07:00 | 6 | 500 PSI | 1700 PSI | n/a | 43 | 55507 |
| 08:00 | 6 | 500 PSI | 1700 PSI | n/a | 43 | 58087 |

Persons of ordinary skill in the art will recognize that many modifications may be made to the present application without departing from the spirit and scope of the application. The embodiment(s) described herein are meant to be illustrative only and should not be taken as limiting the invention, which is defined in the claims.

The invention is also provided as follows:

A system for delivering pipeline fluids from a subsea location to a surface location, comprising:
  a means for capturing fluid from a pipeline; and
  a conveyance means comprising at least one pump member and at least one motor, the motor being operationally configured to power the pump member;
  one or more conduits for conveying the captured fluid to the surface location; and
  one or more conduits for conveying flowable fluid from the surface to the motor to power the motor; wherein the flowable fluid being discharged subsea following use.

The above system, further comprising a separator for separating captured fluid.

A system for delivering pipeline fluids from a subsea location to a surface location, comprising:
  a means for capturing fluid from a pipeline;
  a separator for separating captured fluid; and
  a conveyance means comprising at least one pump member and at least one motor, the motor being operationally configured to power the pump member;
  one or more conduits for conveying the captured fluid to the surface location; and
  one or more conduits for conveying flowable fluid from the surface to the motor to power the motor; wherein the flowable fluid being discharged subsea following use.

A method for delivering pipeline fluids from a subsea location to a surface location, comprising:
  providing a system having (1) a means for capturing fluid from a pipeline; (2) a conveyance means comprising at least one pump member and at least one motor, the motor being operationally configured to power the pump member; (3) one or more conduits for conveying the captured fluid to the surface location; and (4) one or more conduits for conveying flowable fluid from the surface to the motor to power the motor;
  joining the system to a target pipeline so that the pump is in fluid communication with the pipeline;
  delivering flowable fluids from the surface to the motor to power the motor, which in turn powers the associated pump; and
  pumping fluid from the pipeline to the surface location;

the method being accomplished while discharging the flowable fluid into the ambient environment subsea.

A method for overcoming subsea hydrostatic pressure associated with conveying fluids from a subsea pipeline to a surface location, comprising:
providing a conveyance means for pumping pipeline fluid to the surface location, the conveyance means including a drilling motor operationally configured to power a pump; and
directing flowable fluid from the surface to the motor to power the conveyance means.

A system for de-icing a subsea pipeline comprising:
a means for capturing fluid from a pipeline; and
a conveyance means comprising at least one pump member and at least one motor, the motor being operationally configured to power the pump member;
one or more conduits for conveying the captured fluid to the surface location; and
one or more conduits for conveying flowable fluid from the surface to the motor to power the motor; wherein the flowable fluid being discharged subsea following use.

The above system further comprising a separator for separating captured fluid.

A method for de-icing a subsea pipeline comprising:
providing a system having (1) a means for capturing fluid from a pipeline; (2) a conveyance means comprising at least one pump member and at least one motor, the motor being operationally configured to power the pump member; (3) one or more conduits for conveying the captured fluid to the surface location; and (4) one or more conduits for conveying flowable fluid from the surface to the motor to power the motor;
joining the system to a target pipeline having an ice plug therein in a manner so that the pump is in fluid communication with the pipeline;
delivering flowable fluids from the surface to the motor to power the motor, which in turn powers the associated pump; and
pumping fluid from the pipeline to the surface location, thereby dropping pressure within the pipeline downstream of the ice plug;
the method being accomplished while discharging the flowable fluid into the ambient environment subsea.

A system for powering a pump in deep water and ultra deep water environments, comprising:
a drilling motor operationally configured to power the pump;
a means for conveying flowable fluid from the surface to the drilling motor subsea for powering the motor;
a housing for sealing the connection between the motor and the pump, the housing being operationally configured to allow the rotor drive systems of the motor and pump to turn true center during operation.

The above system wherein the flowable fluid is discharged subsea.

The above system wherein the housing has a flex joint for allowing the rotor drive systems of the motor and pump to turn true center during operation.

We claim:

1. A method of recovering a pipeline fluid from a source of the pipeline fluid located in a subsea environment comprising the steps of:
positioning a fluid powered motor and a pump in the subsea environment;
connecting the pump to the source of the pipeline fluid with one or more conduits, wherein the source of the pipeline fluid consists of a pipeline, a pipeline end termination, a producing well, a pipeline and a pipeline end termination, or a pipeline and a producing well;
connecting a separator to the source of the pipeline fluid with a pipeline conduit of the one or more conduits;
connecting the separator to the pump with a first fluid conduit of the one or more conduits;
communicating pressurized seawater from a water surface through a seawater conduit into the fluid powered motor to actuate the fluid powered motor;
discharging the pressurized seawater from the fluid powered motor into the subsea environment;
driving the pump with the fluid powered motor to decrease pressure in at least the first fluid conduit and the pipeline conduit of the one or more conduits for removing or acting on a blockage in the pipeline fluid to result in a flow or an increased flow of the pipeline fluid from the source of the pipeline fluid; and
pumping a liquid portion of the pipeline fluid with the pump through a second fluid conduit to the water surface.

2. The method of claim 1, further comprising the steps of:
providing the separator along the pipeline downstream from the source of the pipeline fluid, wherein the step of driving the pump with the fluid powered motor decreases pressure in the separator;
communicating the pipeline fluid having the blockage acted on or removed into the separator to separate the pipeline fluid into gas and liquid; and
venting the gas from the separator.

3. The method of claim 1, wherein the blockage comprises a hydrate plug, an ice plug, a paraffin wax deposit, or a paraffin deposit.

4. A method for hydrate remediation and fluid recovery from a subsea location, the method comprising the steps of:
providing a pump in fluid connection with a separator, wherein the pump and the separator are connected with a first fluid conduit and are located in a subsea environment;
connecting the separator to a subsea fluid source using a pipeline conduit, wherein the subsea fluid source consists of a pipeline, a pipeline end termination, a producing well, a pipeline and a pipeline end termination, or a pipeline and a producing well, wherein the subsea fluid source contains a fluid comprising a blockage;
actuating the pump to decrease pressure in at least the separator and in the pipeline conduit to act on or remove the blockage in the fluid to result in flow or increased flow of the fluid from the subsea fluid source through the pipeline conduit into the separator;
separating the fluid into a gas and a liquid with the separator; and
pumping the liquid with the pump through a second fluid conduit to a water surface.

5. The method of claim 4, further comprising the step of communicating the gas from the separator through a third fluid conduit to the water surface.

6. The method of claim 4, further comprising the step of injecting methanol, a methanol solution, or a hydrate inhibitor into the separator, pipeline conduit, or combinations thereof to prevent hydrates from forming.

7. The method of claim 4, wherein the blockage comprises a hydrate plug, an ice plug, a paraffin wax deposit, or a paraffin deposit.

8. The method of claim 4, further comprising deploying equipment from a surface platform.

9. A method for acting on or removing a blockage from a pipeline fluid in a subsea environment, the method comprising the steps of:
positioning a fluid pump and a separator in the subsea environment, wherein the fluid pump and the separator are connected by a first fluid conduit;

connecting the separator to a pipeline comprising the pipeline fluid containing the blockage;

actuating the fluid pump to decrease pressure in at least the separator and the pipeline, thereby:

acting on or removing the blockage to result in flow or increased flow of the pipeline fluid; and communicating the pipeline fluid having the blockage acted on or removed through the separator to separate the pipeline fluid into liquid and gas; and pumping the liquid with the fluid pump through a second fluid conduit.

10. The method of claim 9, further comprising the step of communicating the gas from the separator through a third fluid conduit.

11. The method of claim 9, wherein the blockage comprises a hydrate plug, an ice plug, a paraffin wax deposit, or a paraffin deposit.

12. The method of claim 9, further comprising the step of injecting methanol, a methanol solution, or a hydrate inhibitor into the separator, the pipeline, or combinations thereof to prevent hydrates from forming.

13. The method of claim 9, further comprising deploying equipment from a surface platform.

* * * * *